United States Patent [19]
Wambolt

[11] Patent Number: 5,640,795
[45] Date of Patent: Jun. 24, 1997

[54] ROD GUARD-FISHING ROD PROTECTION SYSTEM

[76] Inventor: Robert Glenn Wambolt, 19228 Adak Cir., Eagle River, Ak. 99577

[21] Appl. No.: 550,796

[22] Filed: Oct. 31, 1995

[51] Int. Cl.⁶ .................................................. A01K 97/08
[52] U.S. Cl. .............................. 43/26; 206/315.11; 220/8
[58] Field of Search ................ 43/26, 54.1; 206/315.11; 220/8, 375

[56] References Cited

U.S. PATENT DOCUMENTS

| | | | |
|---|---|---|---|
| 2,143,720 | 1/1939 | Smith | 220/8 |
| 2,888,970 | 6/1959 | Seaver | 220/8 |
| 2,919,017 | 12/1959 | Weber | 43/26 |
| 3,811,216 | 5/1974 | Savey et al. | 43/26 |
| 5,325,988 | 7/1994 | Ekern | 220/411 |

*Primary Examiner*—Jeanne Elpel

[57] ABSTRACT

An improved fishing rod protector that is to be used on a two piece fishing rod with equal or unequal fishing rod section lengths, with or without a fishing reel attached. The invention is comprised of two cylinders, each open on one end and closed on the other. The cylinders are attached to each other by means of an elastic cord routed through the hollows of each cylinder and connected at the rear of each cylinder. The two piece fishing rod sections are arranged, then closely grouped and inserted into the hollows of the cylinders. The elastic cord is stretched and then returned to its undisturbed length, thus holding the two cylinders in place. A fishing reel can be attached to the rod and the fishing line can be strung on the fishing rod guides without affecting the invention. A portion of the fishing rod is exposed for viewing. When not in use, the invention stores conveniently one cylinder inside the other.

4 Claims, 3 Drawing Sheets

ROD GUARD-FISHING ROD PROTECTION SYSTEM

BACKGROUND OF THE INVENTION

1. Field of the Invention

This invention relates to an improved fishing rod protector that is to be attached to, rather than encasing in, a two piece fishing rod with equal or unequal rod section lengths, with or without a fishing reel attached. Further, the invention is easy to install and remove, allows for viewing of the fishing rod when the invention is installed and stores compactly when not in use.

2. Prior Art

Typically, when a two piece fishing rod is transported or stored, it is protected inside a long capped cylinder, with or without a fishing reel attached. You cannot view the contents of the typical fishing rod case. The fishing rod case itself is bulky, or inconvenient, or is designed to carry more than one fishing rod.

Dewin B. Turners U.S. Pat. No. 1,903,798 issued April, 1933, called "Carrier Case" is a long tube designed to encase the entire fishing rod, restricts from view what fishing rod or rods are contained within and is bulky.

Theodore L. Smiths U.S. Pat. No. 2,143,720 issued January, 1939, called "Rod Case" is a long collapsible rod case encasing the entire fishing rod, restricts from view what fishing rod is contained within, is bulky and requires the fishing reel to be removed.

John H. Fishers U.S. Pat. No. 2,149,087 issued February, 1939, called "Protective Rod and Reel Case" encases the entire rod with a compartment for a fishing reel, restricts from view what fishing rod is contained within, and is bulky.

Gordon N. Tuttons U.S. Pat. No. 2,473,977 issued June, 1949, called "Enclosing Case for Fishing Rods and the Like" encases the entire rod, restricts from view what fishing rod is contained within, and is bulky.

Paul A. Flemings U.S. Pat. No. 250,270 issued March, 1950, called "Fish and Gun box" encases the entire rod, restricts from view what fishing rod is contained within, and is bulky.

William R. Chalkers U.S. Pat. No. 2,591,674, issued April, 1952, called "Fishing Rod Carrying Case" encases the entire rod, restricts from view what fishing rod is contained within, restricts from view what fishing rod is contained within, and is bulky.

Jerome G. Daviau U.S. Pat. No. 2,595,230, issued May, 1952, called "Fishing Rod Case" attaches the fishing rod by means of clips, encasing from view the fishing rod, and is bulky.

Everett C. Surings U.S. Pat. No. 2,650,449, issued September, 1953, called "Fly Rod and Reel Case" is designed primarily for just a fly rod and reel, encases the entire fishing rod, the rod is attached by clips, and is bulky.

Boyd W. McKerns U.S. Pat. No. 2,749,645, issued June, 1956, called "Fishing Gear Container" encases the fishing rod by means of utilizing interconnected coplanar parallel telescoping tubes.

John L. Kleckleys U.S. Pat. No. 2,854,775, issued October, 1958, called "Fishing Rod Case" encases the fishing rod or rods by means of parallel pockets, requires the fishing reel to be removed, and restricts from view the contents.

Jack E. Duffs U.S. Pat. No. 2,855,223, issued May, 1959, called "Telescopic Tube Coupling With Step Adjustment Means" encases its contents, restricts from view its contents and utilizes telescoping elongated members.

Clarence W. Harveys U.S. Pat. No. 2,902,790, issued September, 1959, called "Rod and Reel Case" encases the entire fishing rod and reel by means of an elongated rod receiver section having a plurality of parallel rod section recesses, restricts from view is contents, and is bulky.

Franklin H. Webers U.S. Pat. No. 2,919,017, issued December, 1959, called "Telescopic Carrying Case" encases its contents, utilizes telescoping tubes, restricts from view its contents and is bulky.

Lowell H. Morriss U.S. Pat. No. 2,962, 187, issued November, 1960, called "Article Carrying Case" is a rigid elongated tube that encases, restricts from view its contents and is bulky.

Gerald W. Gottulas U.S. Pat. No. 3,131,503, issued May, 1964, called "Fishing Rod Protector" utilizes telescoping tubes to protect the fishing rod and an elastic bands and hooks tensioned against the fishing reel, requiring that their be a fishing reel attached. When not in use the elastic bands and hooks are exposed.

Claude J. Walkers U.S. Pat. No. 3,349,512, issued October, 1967, called "Interchangeable Rod and Reel Carder Apparatus" encases the entire fishing rod and reel, restricts from view contents, and is bulky.

Herbert J. Slades U.S. Pat. No. 3,399,009, issued August, 1968, called "Rod Case" is formed from conventional extruded metal or plastic strips providing a frame and sheet-like panels anchored to the frame or from a second embodiment the case is in the form of ne end opening sleeve which receives a tray carrying the rods.

Charles M. Marshall et al U.S. Pat. No. 3,356,246, issued December, 1967, called "Telescoping Rod Case with Sliding Cam Lock" encases the fishing rod or rods in a telescoping tubes, restricts from view the contents, and is bulky.

Toney Harrisons U.S. Pat. No. 3,575,327, issued April, 1971, called "Fishing Rod Carrying Cases" is essentially a sheet of flexible material with pockets, requiring the fishing reel to be removed, and conceals from view the contents.

Marshall R. Edwards U.S. Pat. No. 3,618,253, issued November, 1971, called "Fishing Apparatus" utilizes telescoping tubular sections, requires the fishing reel to be attached.

Gordon T. De Bakers U.S. Pat. No. 3,624,948, issued December, 1971 called "Fishing Rod and Reel Case" utilizes a tubular case that is attached to a fishing rod and reel by means of a tensioned elastic band, thereby requiring a fishing reel to be installed, when removed leaves the elastic band externally exposed and is bulky.

Heidtman et al U.S. Pat. No. 3,641,697, issued February, 1972, called "Carrying Case for a Fishing Rod and Reel" encases the entire fishing rod and reel in a rigid plastic hinged carrying case that restricts from view its contents and is bulky.

George R. Wrights U.S. Pat. No. 3,674,190, issued July, 1972, called "Carder for Rods with Reels Attached" is for at least two rods with reels attached, encases the entire fishing rod from view and is bulky.

Waldo O. Ratzlaffs U.S. Pat. No. 3,772,819, issued November, 1973, called "Carrying Case for Fishing Rods and Reels" utilizes a long tubular design to encase a plurality of rods and is bulky.

Sauey et al U.S. Pat. No. 3,811,216, issued May, 1974, called "Adjustable Fishing Rod Case" utilizes telescopic tubes to encase a plurality of fishing rods and is bulky.

Francis E. Geislers U.S. Pat. No. 3,972,144, issued August, 1976, called "Fishing Rod and Reel Case" utilizes an essentially rectangular shape with elongated compartments running parallel to its length to encase more than one fishing rod with or with reel.

Charles J. Wycoskys U.S. Pat. No. 4,136,478, issued January, 1979, called "Fishing Pole and Reel Holding Bag" utilizes a bag to encase a single fishing rod and reel.

Milton K. Wards U.S. Pat. No. 4,170,801, issued October, 1979, called "Fishing Rod and Reel Box" encases a plurality of fishing rods and reels, restricts from view the contents and is bulky.

Hoffman et al U.S. Pat. No. 4,171,588, issued October, 1979, called "Plastic Carrying Case for a Fishing Rod and Reel" encases the entire fishing rod and reel, restricts from view what is contained and is bulky.

Ronald A. Becks U.S. Pat. No. 4,222,193, issued September, 1980, called "Fishing Rod Case" is specifically for a fishing rod only, encasing the entire fishing rod in a braided plastic filament.

Jack L. Evans U.S. Pat. No. 4,546,877, issued October, 1985, called "Fishing Rod and Reel Cover" encases the entire fishing rod and reel, restricts from view what is contained within and is bulky.

Douglas M. Rays U.S. Pat. No. 4,641,454, issued February, 1987, called "Protective Sock for a rod and Reel" utilizes a protective sock to enclose a fishing rod and reel.

McBride et al U.S. Pat. No. 4,726,141, issued February, 1988, called "Fishing Rod and Reel Carrying Case" can carry more than one fishing rod with reel attached, encases only the fishing handle area with reel attached.

Homer L. Crafts U.S. Pat. No. 4,967,504, issued November, 1990, called "Fishing Rod and Reel Protector" encases the fishing rod in a elongated tube and expanded hollow area for fishing reel requiring a fishing reel, and is bulky.

Smith et al U.S. Pat. No. 5,046,279, issued September, 1991, called "Carrying Case for Fishing Rod and Reel" encases the entire fishing rod and reel, restricting from view what fishing rod is contained within, and is bulky.

Vonley D. Vances U.S. Pat. No. 5,319,874, issued June, 1994, called "Rod and Reel Case" encloses the entire fishing rod and reel, restricts from view what fishing rod is contained within, and is bulky.

Lannan et al U.S. Pat. No. 5,327,669, issued July, 1994, called "Rod Organizer" can contain a plurality of fishing rod and reels and is primarily a rectangular shaped fabric with multiple pouches encasing the entire fishing rod and reel.

Hepworth et al U.S. Pat. No. 5,341,590, issued August, 1994, called "Carrying Case for Fly Fishing Rod and Reel" encases the fishing rod and reel entirely and is bulky.

Matthew A. Millers U.S. Pat. No. 5,425,194, issued June, 1995, called "Fishing Rod Case" encases the fishing rod entirely in a hollow cylindrical tube, restricts from view the contents and is bulky.

Whatever the precise merits, features and advantages of the above cited references, none of them achieves or fulfills the purpose of protecting the two piece fishing rod with or without a fishing reel attached while in transit or storage, yet be easy to install, remove and store like the present invention.

SUMMARY OF THE INVENTION

A novel protection for the transportation and storage of a two piece fishing rod is disclosed. The invention is comprised of two hollow cylinders each open at one end and closed at the other and connected together by an elastic cord that has been routed through the hollows of each cylinder and connected in two locations at the rear of each cylinder. The butt section of a two piece fishing rod provides structural support for the invention, while the invention provides protection for the two piece fishing rod. The rod butt section and rod tip section are closely grouped together oriented rod handle to rod tip and butt ferrule to tip ferrule. The invention is then installed on the rod such that one hollow cylinder is placed on the rod butt handle and rod tip grouping and allowed to travel to the bottom of the hollow cylinder. The other hollow cylinder is placed over the rod butt ferrule and rod tip grouping and allowed to travel to the bottom of the cylinder such that each cylinder will maintain the rod sections closely grouped while protecting the fishing rod ends from damage. The hollow cylinders being attached together by means of the elastic cord at the closed end of the hollow cylinder, will maintain both cylinders in place with slight tension. The length of the elastic cord when installed is equal to the length of the fishing rod butt section with each hollow cylinder contacting at its closed end with either the rod butt ferrule or rod butt handle.

An alternate method is suggested if the rod tip section is longer than the rod butt section. A post secured with a nut is installed on the hollow cylinder that is used in conjunction with the rod butt handle and rod tip grouping such that the rod butt handle stops its travel inside the cylinder at the post location while allowing the rod tip to travel to the bottom of the hollow cylinder. Additional space is thus provided for the additional length of the rod tip section, the rod butt section will provide the structural support, and the cylinders will be tensioned by means of the elastic cord with one hollow cylinder contacting the rod butt ferrule end and one hollow cylinder contacting the rod butt handle at the post, and the length of the elastic cord is equal to the rod butt section length plus the additional length from the post to the bottom of the cylinder.

The two piece fishing rod can have a fishing reel installed without affecting the invention, and the line contained on the reel can be strung through the guides of the fishing rod and incidental fishing tackle attached to the end of the fishing line such that the fishing rod will be ready to fish once the invention is removed and the two piece rod assembled for use. When not in use the invention may be stored by first compacting all the exposed elastic cord inside the hollow of one cylinder and then placing the smaller diameter cylinder inside the other cylinder until the two cylinders are interlocked by means of mated screw threads.

BRIEF DESCRIPTION OF THE DRAWINGS

FIG. 4 is an enlarged end view of the invention as illustrated in FIG. 2.

OBJECTS OF THE INVENTION

Figure 1:
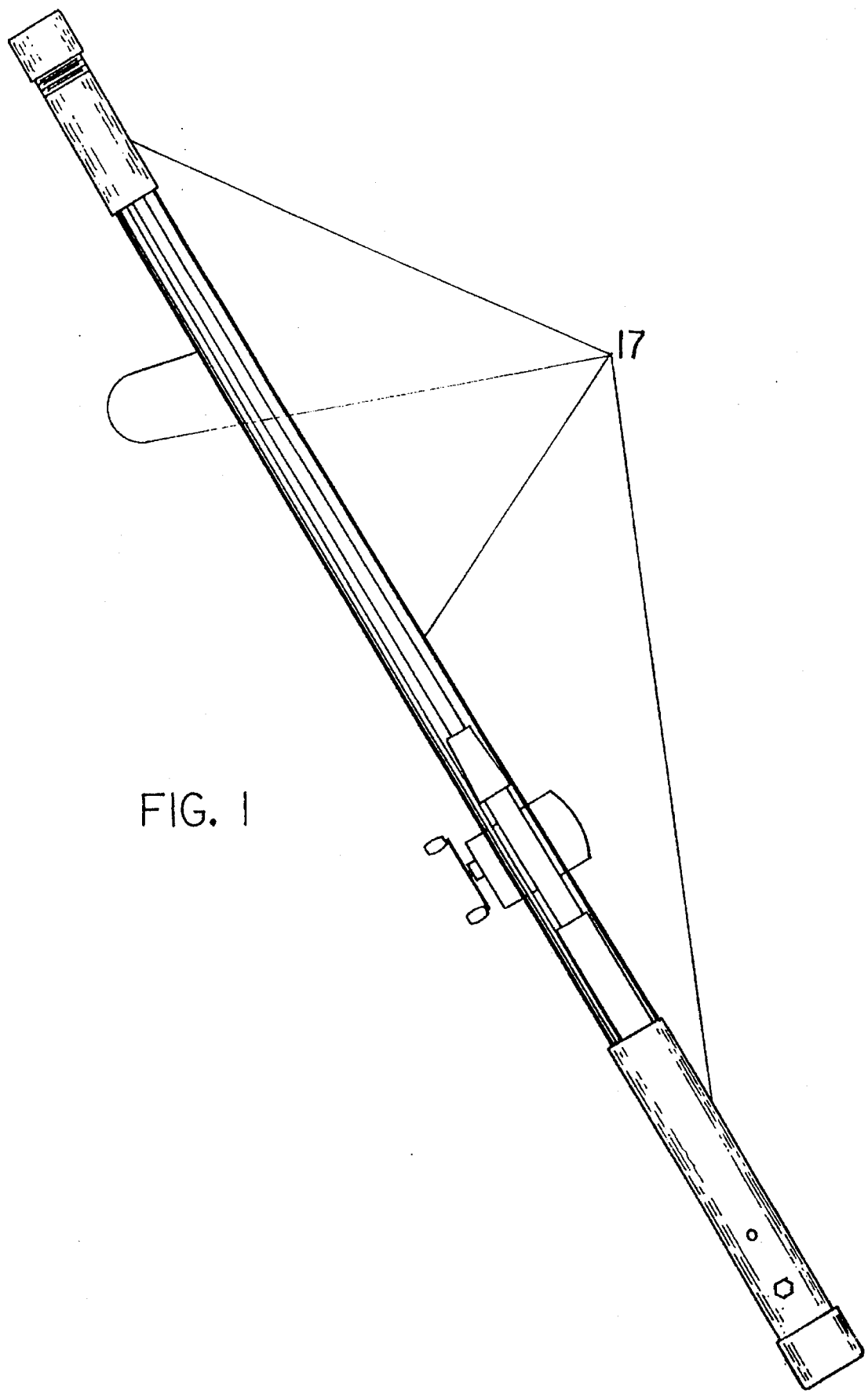
FIG. 1 is a pictorial representation of the invention installed on a two piece fishing rod with fishing reel attached.

1. Hollow cylinder
2. Hollow cylinder cap
3. Hollow cylinder
4. Hollow cylinder cap
5. Elastic cord 6. Post
7. Nut
8. Hole
9. Hole
10. Hole
11. Hole
12. Hole
13. Hole
14. Knot
15. Screw Thread
16. Screw Thread
17. The invention
18. Elastic Cord End
19. Elastic Cord End
20. Hole
21. Hole

DETAILED DESCRIPTION OF THE DRAWINGS

In FIG. 1 the ROD GUARD-fishing rod protection system is designated by a general reference number 17, which is shown installed on a two piece fishing rod with fishing reel attached.

Figure 2:
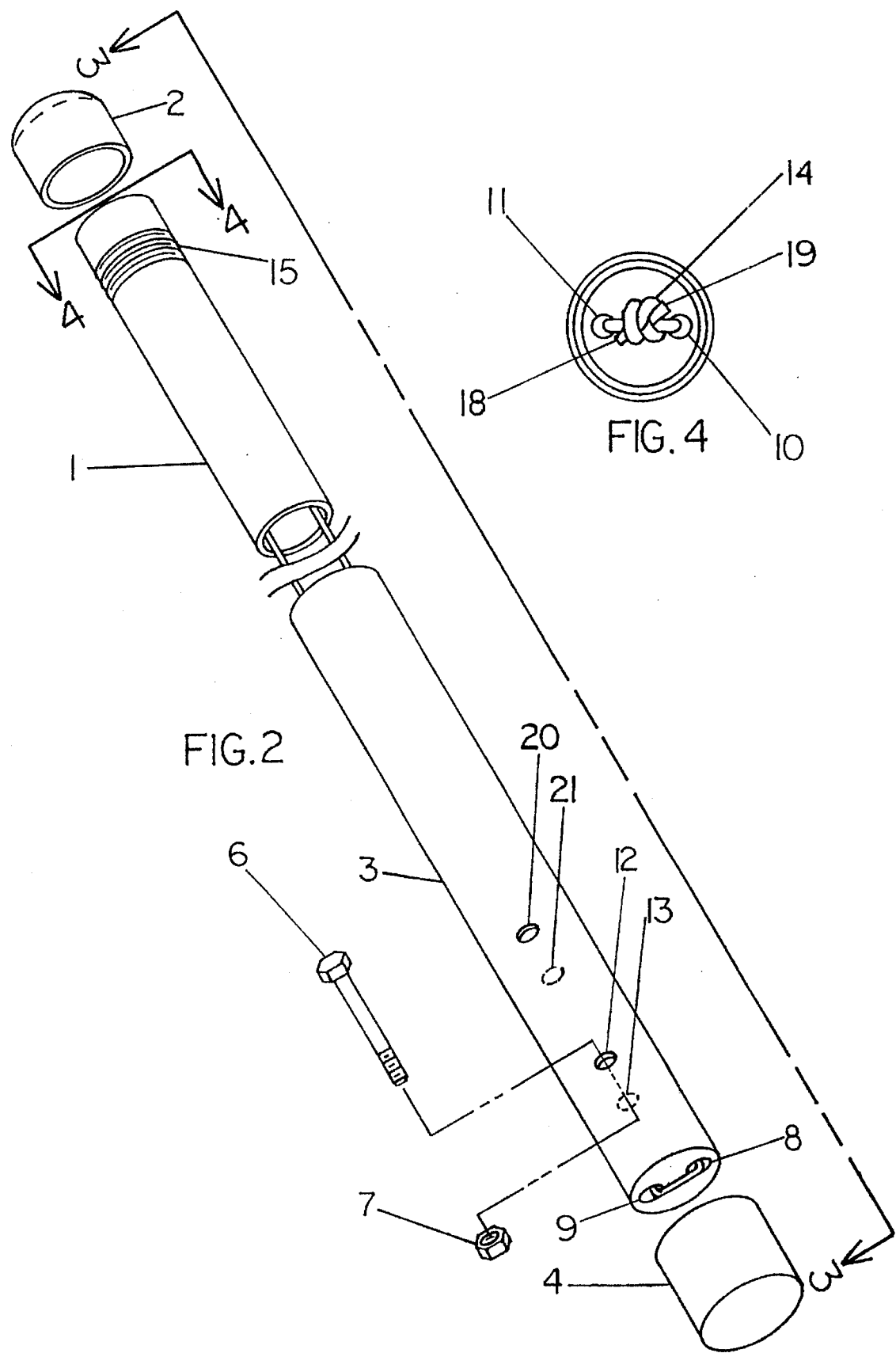
FIG. 2 is a top view of the invention.

In FIG. 2 a hollow cylinder 1 and hollow cylinder 3 and hollow cylinder cap 2 and hollow cylinder cap 4 can all be made from a strong molded plastic material.

Figure 3:
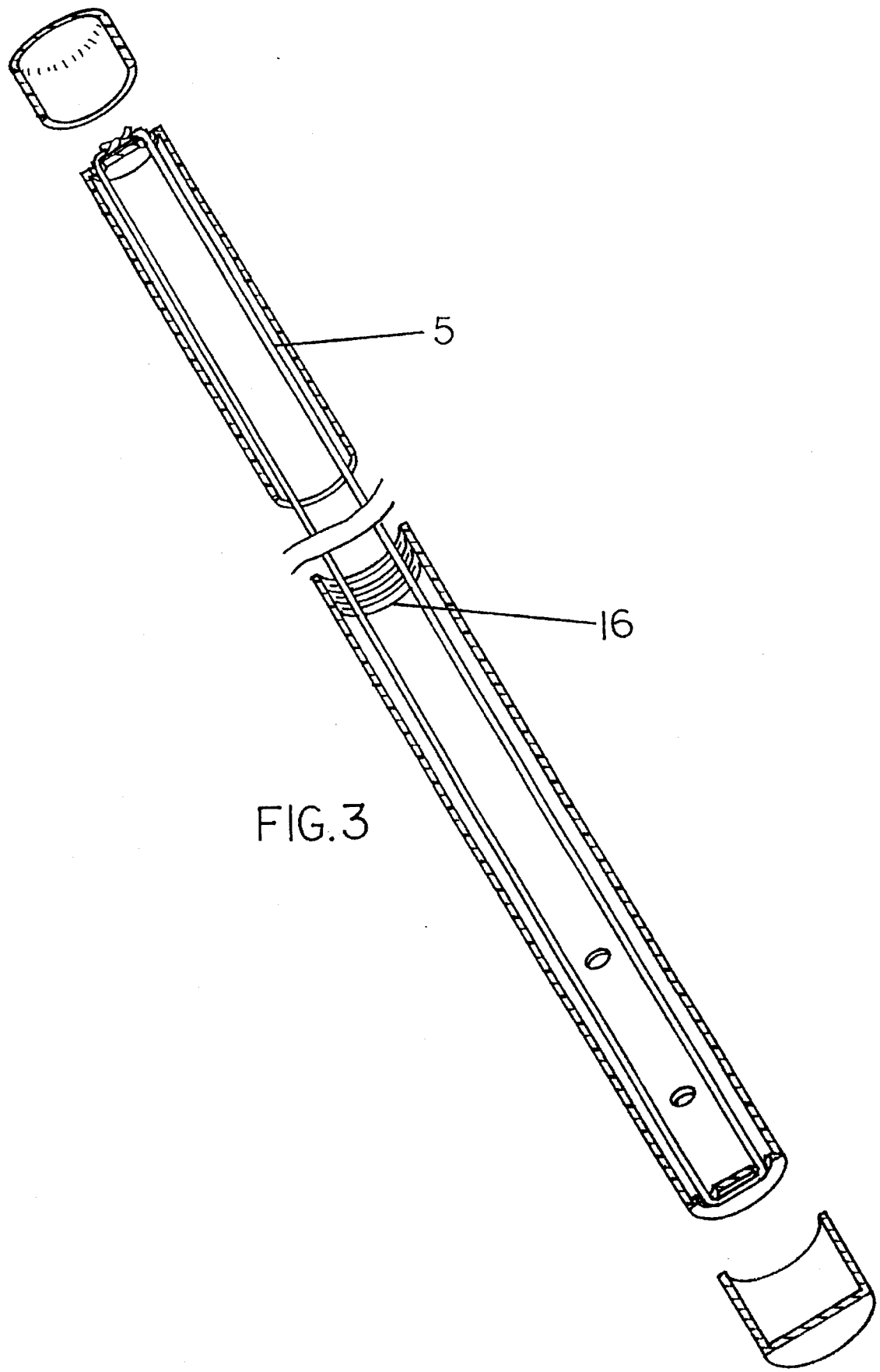
FIG. 3 is a sectional view of the invention taken along plane 3—3 as illustrated in FIG. 2.

Referring to FIG. 2, FIG. 3, and FIG. 4, the hollow cylinder 1 and hollow cylinder 3 are connected together by means of an elastic cord 5 by placing elastic cord end 18 through hole 10 such that it exits outside the open end of hollow cylinder 1, then continue elastic cord end 18 through the open end of hollow cylinder 3 and exits through hole 8. Elastic cord end 18 continues into hole 9 such that it exits outside the end of hollow cylinder 3, then elastic cord end 18 continues through the open hollow cylinder 1 exiting through hole 11. Elastic cord end 18 and elastic cord end 19 into knot 14 as seen in FIG. 4, using sufficient length of elastic cord 5 as described later. A two piece fishing rod is comprised of a butt section with ends called rod handle and rod ferrule, and a rod tip section with ends called tip ferrule and rod tip. Orienting the sections of the two piece rod such that the rod handle and rod tip, and butt ferrule and tip ferrule are adjacent, closely gather the butt and tip sections and place the rod handle and rod tip ends of the fishing rod in the opening of hollow cylinder 3 inserting both fishing rod sections in until they rest on the bottom of the cylinder, then insert the open end of hollow cylinder 1 over the closely grouped rod butt ferrule and rod tip ferrule and allow hollow cylinder 1 to traverse until the fishing rod ferrule ends rest on the bottom of the cylinder. Slightly tension elastic cord 5 by pulling on elastic cord end 18 and elastic cord end 19 then tie knot 14.

An alternate method for installation exists for two piece fishing rods where the fishing rod tip section is longer than the butt section. Referring to FIG. 2, install post 6 in hollow item 3 at hole 12 exiting at hole 13 and securing with nut 7. Take the closely grouped rod butt handle and rod tip and placed into the hollow cylinder 3 until the rod butt stops at the post and allow the rod tip to continue until it rest at the bottom of the cylinder. Hole 20 and 21 have similar use to hole 12 and 13 are used in the same application as holes 12 and 13, except the installation would be for a rod tip section longer than the previous example of holes 12 and 13. The length of the installed elastic card 5 is the slightly tensioned length of the fishing rod butt section with each hollow cylinder 1 and 3 contacting at its closed end with either the rod butt ferrule or rod butt handle. The alternate slightly tensioned length of elastic cord 5 is the installed length of the fishing rod butt section plus the space from post 6 to the bottom of the cylinder 3, with one hollow cylinder 1 contacting the rod butt ferrule and the rod butt handle contacting the post 6. Install cap 2 on hollow cylinder 1 and cap 4 on hollow cylinder 3 by interference fit. The preferred embodiment is now correctly installed on a two piece fishing rod as seen in FIG. 1.

Referring to FIG. 1 and FIG. 2, to remove the preferred embodiment grasp the two piece fishing rod mid way and apply a force great enough to stretch elastic cord 5 until hollow cylinder 1 disengages and is then brought off to one side of the exposed ferrule ends of the fishing rod. Release pressure such that the elastic cord returns to its undisturbed length, then remove hollow cylinder 3. The preferred embodiment is now removed from the two piece fishing rod. The preferred embodiment compacts when not used by first compacting excess elastic cord 5 inside either hollow cylinder 1 or 3, then place the open end of hollow cylinder 1, a smaller diameter cylinder than hollow cylinder 3, inside the open end of hollow cylinder 3, until mating threads 15 and 16 are interlocked.

The present invention may be embodied in other specific forms and with additional options and accessories without departing form the spirit or essential attributes thereof. The presently disclosed embodiment is therefore to be considered in all respects as illustrative and not restrictive, the scope of the invention being indicated by the appended claims rather than by the foregoing description, and all changes which come within the meaning and range of equivalence of the claims are therefore intended to be embraced therein.

I claim:

1. An improved fishing rod protector comprising; in combination:

a first hollow cylindrical elongated member having an outer and inner surface, a open end, a closed end with two holes through the closed end, and threaded on the outer surface near the closed end;

a second hollow cylindrical elongated member, having an outer and inner surface, a open end, a closed end with two holes through the closed end, and threaded on the inner surface at the open end, four holes aligned along the length and passing through the diameter of the cylindrical member in sets of two, a inner diameter larger than an outer diameter of the first hollow cylindrical member sufficient to mate with a first hollow cylinder member by clearance fit;

a post and nut assembled with the second hollow cylindrical elongated member through one of said two sets of holes;

an elastic cord connecting the first hollow cylindrical elongated member with the second hollow cylindrical member by routing the ends of the elastic cord through the holes in the closed end of the second hollow cylindrical elongated member by starting at the outer surface thereof passing through to the inner surface thereof, then traveling through the second hollow cylindrical elongated member and exiting at the open end, then passing through the inner surface of the first hollow cylindrical elongated member and exiting through the holes therein and arriving at the outer surface of the closed end of the first hollow cylindrical member where the two ends of the elastic cord are joined in a knot;

a first cap secured by interference fit to the outer surface of the closed end of the first hollow cylindrical elongated member;

a second cap secured by interference fit to the outer surface of the closed end of the second hollow cylindrical elongated member.

2. The fishing rod protector of claim 1, wherein the elastic cord is storable by bundling the elastic cord inside either the first hollow cylindrical member or the second hollow cylindrical member, the cylindrical members then joined by threading the first hollow cylindrical elongated member threaded outer surface with the second hollow cylindrical member threaded inner surface.

3. A fishing rod protector comprising; in combination:

a first hollow cylindrical elongated member having an outer and inner surface, a open end, a closed end with two holes through the closed end, and threaded on the outer surface near the closed end;

a second hollow cylindrical elongated member, having an outer and inner surface, a open end, a closed end with two holes through the closed end, and threaded on the inner surface near the open end, and a inner diameter larger than an outer diameter of the first hollow cylindrical member sufficient to mate with the first hollow cylindrical member by clearance fit;

an elastic cord connecting the first hollow cylindrical elongated member with the second hollow cylindrical member by routing the ends of the elastic cord through the holes in the closed end of the second hollow cylindrical elongated member by sinning at the outer surface thereof passing through to the inner surface thereof, then traveling through the second hollow cylindrical elongated member and exiting at the open end, then passing through the inner surface of the first hollow cylindrical elongated member and exiting through the holes therein and arriving at the outer surface of the closed end of the first hollow cylindrical member where the two ends of the elastic cord are joined in a knot;

a first cap secured by interference fit to the outer surface of the closed end of the first hollow cylindrical elongated member;

a second cap secured by interference fit to the outer surface of the closed end of the second hollow cylindrical elongated member.

4. The fishing rod protector of claim 3, wherein said second cylindrical member includes four holes aligned along the length and passing through the cylindrical member in sets of two; and, including a post and nut assembly mating with one of the two sets of holes.

* * * * *